June 25, 1968   C. C. TETZLAFF   3,389,442
HOSE CLAMP WITH LOAD DISTRIBUTING MEMBER
Filed May 13, 1966
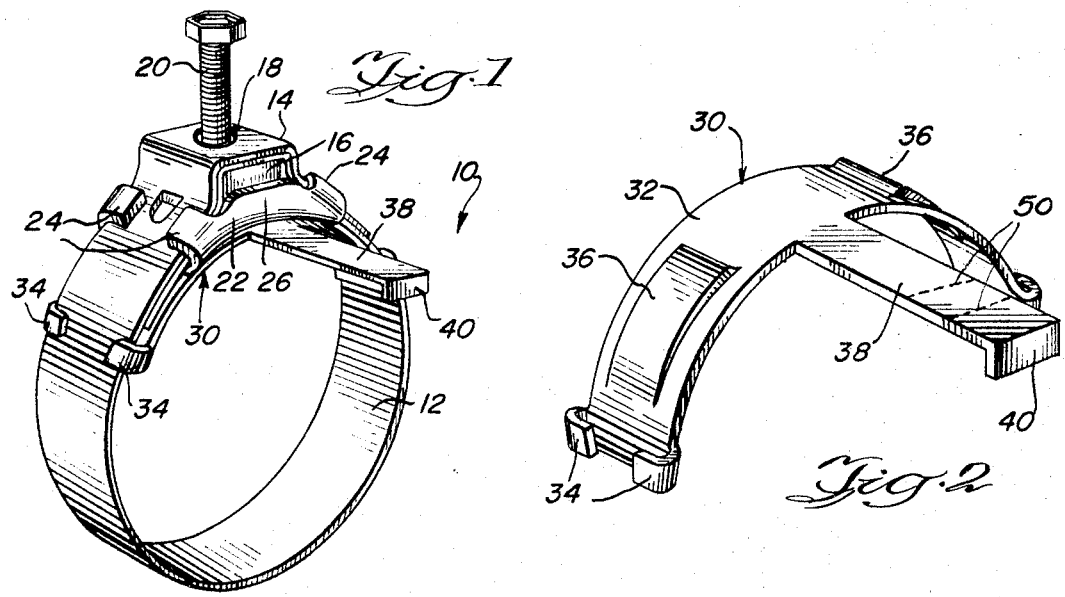
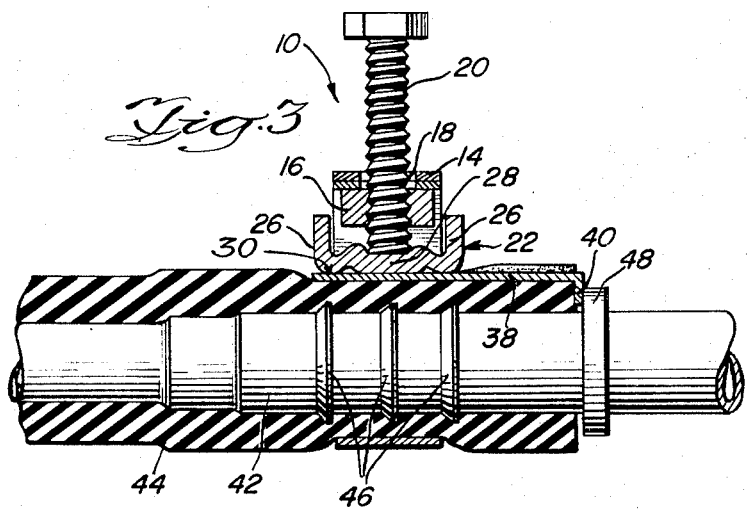
INVENTOR
Clarence C. Tetzlaff
BY Silverman & Cass
ATTORNEYS

United States Patent Office 3,389,442
Patented June 25, 1968

3,389,442
HOSE CLAMP WITH LOAD DISTRIBUTING
MEMBER
Clarence C. Tetzlaff, River Forest, Ill., assignor to Wittek Manufacturing Co., Chicago, Ill., a corporation of Illinois
Continuation-in-part of application Ser. No. 447,014, Apr. 9, 1965. This application May 13, 1966, Ser. No. 549,980
2 Claims. (Cl. 24—278)

The invention is a continuation-in-part of my application Ser. No. 447,014 filed Apr. 9, 1965.

This invention relates generally to hose clamps and more particularly is concerned with a radial type of hose clamp having a fitted bridge and a load distributing member.

The primary object of the invention is to provide a hose clamp with a load distributing member having spacing means in order to enable the proper location of the hose clamp relative to the pipe or spud upon which the hose is being secured.

It has been customary in the hose clamp art and especially in the case of hose clamps intended for use with high pressure connections to secure spacers to the hose clamp. The conventional hose clamp of any suitable type will have lateral spacing extensions welded to the band of the hose clamp. When the workman assembles a hose upon a spud or pipe, a suitable ring on the pipe properly positions the hose so the hose clamp is secured with the extension member located at the same ring so that it is known with certainty that the clamp will engage the spud immediately over annular ridges provided on the spud to resist withdrawal of the hose.

Attachment of such extension members by means of welding is expensive, time-consuming and wells are often subject to corrosion and breakage before use.

In the parent application of which this forms a continuation-in-part, there is disclosed a hose clamp of the radial type with a fitted bridge having a load-distributing member. The load-distributing member is made separately from the hose clamp and afterwards is secured thereto by the simple expedient of bending end ears over onto the hose clamp band. Since the load distributing member is made separately and secured separately it has been found that if a spacing extension is formed integral with the load-distributing member there is no additional expense in assembling the hose clamp. The same mechanism used for securing the load-distributing member to the hose clamp may be used with or without the spacing means. This gives rise to considerable saving.

Accordingly, the principal object of the invention is to provide a hose clamp of the character described having a load-distributing member in which spacing means are integrally formed with the load-distributing member.

Other objects and advantages will occur to those skilled in the art as the description of the invention proceeds in connection with the drawing which illustrates the preferred embodiment.

In the said drawing:

FIG. 1 is a perspective view showing a radial hose clamp having a load-distributing member and spacing means integral with the load-distributing member in accordance with the invention.

FIG. 2 is a perspective view of the load-distributing member itself, apart from the hose clamp.

FIG. 3 is a sectional view through a hose clamp constructed according to the invention shown secured upon a hose which in turn is fastened to a pipe or spud end.

Reference character 10 generally designates a radial type of hose clamp having a metal band 12 looped upon itself to form a cylindrical configuration, the axis of such configuration comprising the axis of the hose clamp. At the circumferential location where the ends of the band 12 overlap there is radially outwardly extending rectangular projection 14 having a nut 16 disposed therein, and having a perforation 18 radially through the projection to enable a screw 20 to engage the nut. A bridge 22 fitted to the hose clamp closes the inner open end of the projection 14 so that the cylindrical configuration is substantially continuous, the bridge having arms 24 engaging over the top of the band 12 on opposite circumferential sides of the projection 14 and side flanges 26 retaining the nut 16 by closing off the opposite axial sides of the projection 14. The bottom wall 28 of the hose clamp serves as a thrust bearing support for the end of the screw 20 so that as the screw is turned the nut 16 will ride up and increase the radially outward dimension of the projection 14 pulling the band through the arms 24 in a manner well-known.

In the copending application the load-distributing member 30 which is shown in FIG. 2 is described in some detail. This is a slidably secured arcuate strip of metal 32 having lugs 34 at opposite ends thereof engaging the band so that the load-distributing member 30 may be moved along the band to conform to its curvature as the hose clamp is taken up. Indentations 36 cooperate with the circumferential ends of the bridge 22 for positioning the load-distributing member.

According to the invention herein the load-distributing member 30 has an integral lateral spacing leg 38 extending axially from an edge thereof with a right angle bent end 40. It will be appreciated that the hose clamp 10 may be manufactured completely assembled in any manner which it will be made irrespective of the inclusion of the spacing leg 38. Likewise the load-distributing member 30 may be secured by machinery operating upon the ends thereof so that the lateral spacing leg 38 will not interfere with this operation either. Thus it requires substantially no added expense to assemble hose clamp 10.

In forming the load-distributing member 30 it will be blanked in the flat from sheet metal with the integral leg 38 in the same flat plane. When curved, the member 30 will lie in a cylindrical plane, and since the leg 30 is a very small part of the arc of the member 30, arcuately forming the same will be no problem. After forming the member 30, the leg 38 will lie in the cylindrical plane defined, but for the bent hook-end 40.

In FIG. 3 a spud or pipe 42 is adapted to have a hose 44 telescopically mounted thereon in pressure-tight connection. The wall thickness of the hose is substantial as noted and the pipe 42 has ridges 46 to bite into the hose 44 to prevent it from being forced off the end of the pipe 42. The most efficient connection will be one in which the hose clamp constricts the hose to enable the ridges to bite into the hose. The thickness of the hose makes it difficult to see where the ridges 46 occur making it difficult accurately to locate them so that the hose clamp 10 may be secured immediately over these ridges. Accordingly it is customary for such pipes to have a hose-locating ring 48 so that one may gauge the minimum amount of telescoping of the pipe within the hose 44. Likewise the ring 48 enables one to gauge the proper distance for the hose clamp from the end of the hose. Accordingly in using a hose clamp with spacing means the depending end 40 is hooked around the end of the hose where it abuts against the ring 48 thus achieving the proper spacing.

If desired, two or more such legs 38 may be provided integral with the load-distributing member. Another modification would be to have the legs 38 longer than usual, with or without creases along the length thereof, enabling the user to trim and bend the end of the legs to fit any style of pipe. FIG. 2 illustrates this symbolically by the broken lines 50.

Various modifications are capable of being made without departing from the spirit or scope of the invention as defined in the appended claims.

What it is desired to secure by Letters Patent of the United States is:

1. A hose clamp of the radial type having a band looped upon itself, a radially outwardly formed projection, a nut in the projection, a radial screw passing into the nut, a bridge permanently secured across the inner open end of the projection and the screw bearing on the bridge, an arcuate load-distributing member having its ends slidably mounted to the band to dispose said member beneath the bridge, and spacing means comprising at least one leg extending in an axial direction laterally and substantially in the cylindrical plane of the load-distributing member and integral therewith, the end of said leg having an angularly bent portion.

2. A hose clamp of the radial type having a band looped upon itself, a radially outwardly formed projection, a nut in the projection, a radial screw passing into the nut, a bridge permanently secured across the inner open end of the projection and the screw bearing on the bridge, an arcuate load-distributing member having its ends slidably mounted to the band to dispose said member beneath the bridge, said load-distributing member being completely disconnected from said bridge, and spacing means extending in an axial direction laterally of and integral with the load-distributing member.

References Cited
UNITED STATES PATENTS

| | | | |
|---|---|---|---|
| 1,110,011 | 9/1914 | Schneider | 285—252 X |
| 2,208,706 | 7/1940 | Spencer | 285—253 |
| 2,321,930 | 6/1943 | Murray | 24—278 |
| 2,392,210 | 1/1946 | Zaleske | 24—278 |
| 2,515,484 | 7/1950 | Zaleske | 24—278 |
| 2,963,305 | 12/1960 | Miller | 285—253 X |
| 3,086,270 | 4/1963 | Zartler | 24—278 |

DONALD A. GRIFFIN, *Primary Examiner.*

JAMES L. JONES, JR., *Examiner.*